United States Patent [19]

Thuermer

[11] 4,442,316

[45] Apr. 10, 1984

[54] CRIMP CONNECTOR FOR ELECTRICAL WIRES

[75] Inventor: Joerg H. W. Thuermer, Hamburg, Fed. Rep. of Germany

[73] Assignee: Minnesota Mining and Manufacturing Company, Saint Paul, Minn.

[21] Appl. No.: 317,866

[22] Filed: Nov. 3, 1981

[30] Foreign Application Priority Data

Nov. 15, 1980 [DE] Fed. Rep. of Germany ....... 3043209

[51] Int. Cl.³ ...................... H02G 15/08; H01R 11/00

[52] U.S. Cl. .................................... 174/84 C; 174/87; 174/90

[58] Field of Search .......................... 174/84 C, 87, 90

[56] References Cited

U.S. PATENT DOCUMENTS

| | | | |
|---|---|---|---|
| 2,965,699 | 12/1960 | Bollmeier | 174/84 C |
| 3,688,245 | 8/1972 | Lockshaw | 174/90 X |
| 3,715,705 | 2/1973 | Kuo | 174/84 C X |
| 3,767,841 | 10/1973 | Anderson et al. | 174/84 C |
| 3,814,836 | 6/1974 | Neale, Sr. | 174/90 |
| 3,916,085 | 10/1975 | Hansen | 174/84 C |

*Primary Examiner*—J. V. Truhe
*Assistant Examiner*—Morris H. Nimmo
*Attorney, Agent, or Firm*—Donald M. Sell; James A. Smith; Terryl K. Qualey

[57] ABSTRACT

A crimp connector for electrical wires has two chambers formed from a unitary piece of sheet metal, one chamber for magnet wires and one chamber for connecting wires. Each chamber is formed by a bridge part and a row of a plurality of fingers which depend from the bridge part essentially radially with respect to the axis of the connector and are essentially circularly bent around the bridge part.

10 Claims, 13 Drawing Figures

CRIMP CONNECTOR FOR ELECTRICAL WIRES

FIELD OF THE INVENTION

The invention relates to a crimp connector for interconnecting at least one magnet wire, particularly a varnished wire, and at least one, preferably stranded, connecting wire.

BACKGROUND OF THE INVENTION

U.S. Pat. No. 3,916,085 discloses a crimp connector for magnet wires and stranded wires in which two chambers are formed by two portions of a sheet metal piece, which portions are bent to have a U-shaped cross-section. The two portions are arranged one within the other, the space between the portions forming an outer chamber, and the space within the U cross-section of the inner portion forming an inner chamber. From the description of that known crimp connector, it can be concluded that one may arrange the magnet wires in one chamber, and the connecting conductor in the other chamber, or alternatively may arrange magnet wires as well as stranded connecting conductors in both chambers.

With the prior art crimp connectors, including the connector of U.S. Pat. No. 3,916,085, very high crimping forces must be applied to assure that reliable electrical and mechanical interconnection will be made with the various kinds of wires of the connecting conductors, which may have widely varying diameters. Despite being careful in performing the compressing step, wires are sheared off frequently with prior art crimp connectors due to the high crimping forces. This has the result that the conductors to be connected must be cut off anew, and the whole interconnecting process must be repeated with the use of a new crimp connector. In addition, it is known that in order to obtain reliable interconnections with prior art crimp connectors, the diameter of the magnet wire has to be preferably larger than the diameter of the single strands of the connecting wire, unless complicated provisions are taken to bond together (e.g. by soldering) the strands. However, even with these provisions, the applicability range of the prior art crimping connectors remains limited.

The connector of the present invention has two chambers formed from a unitary piece of sheet metal, the chambers being disposed side-by-side in the connector cross-section and being adapted to be compressed by means of a tool. Each chamber is formed by a bridge part and a row of a plurality of fingers which depend from the bridge part essentially radially with respect to the axis of the connector, and are essentially circulary bent around the bridge part. One of the chambers serves to accommodate the magnet wire, and the other serves to accommodate the connecting wire. At least the magnet wire chamber has cutting means provided on its interior surface, which cutting means, upon compression of the chamber, cuts through the insulation of the magnet wire and effects an electrical contact with the electrically conductive core of the magnet wire.

SUMMARY OF THE INVENTION

In the crimp connector according to the present invention, the chambers are thus formed over an essential part of its circumference, by a plurality of individual fingers, and one chamber is used for magnet wires only, and the other chamber for connecting wires only. It has been found that by these simple measures, a crimp connector is provided which makes possible to provide reliable connections by means of a crimping force which is substantially reduced, as compared with known crimp connectors. The crimping force required can be smaller by about one order of magnitude than the crimping force required with a known crimp connector of comparable dimensions. Therefore, simpler and less expensive pressing tools can be employed for the connectors according to the present invention. More particularly, it is in any cases even possible, because of the smaller pressing force required, to simultaneously press-on an insulating sleeve during the pressing operation. With the known crimp connectors, this was not possible because the high crimping forces would have crushed the insulating sleeve.

Furthermore, it has been found that the danger of wire breaks in the entrance range is greatly reduced, if not even practically completely obviated with the crimp connector according to the present invention. This is particularly apparent if each chamber is provided with at least three, and preferably with five to eight fingers. In the case of lateral forces acting upon the lines, the finger being disposed at the entrance end can yield resiliently more easily than the throughgoing sheet metal portions of the prior art crimp connectors, which are not subdivided into fingers, and thus can reduce the danger of wire breaks. This advantage can be even accentuated by providing that the cross-section of the chambers increases towards the entrance area of the connecting conductors. Thereby, some kind of inlet funnel is obtained, which contributes to protecting the connecting conductors in the case of mechanical stresses.

Furthermore, it has been found that crimp connectors according to the invention are suitable for a relative large range of different wire cross-sections, including very thin varnish-insulated magnet wires as are used in small electric motors, because the individual fingers can adapt themselves to various contours of the wires or wire bundles enclosed by them, more easily than a sheet metal piece extending across the whole length of the connector. Moreover, the range of wire cross-sections which can be operated upon with one and the same pressing tool (having a constant pressing force) is substantially larger than in the case of prior art crimp connectors.

THE DRAWING

DESCRIPTION OF THE PREFERRED EMBODIMENTS

Figure 1:
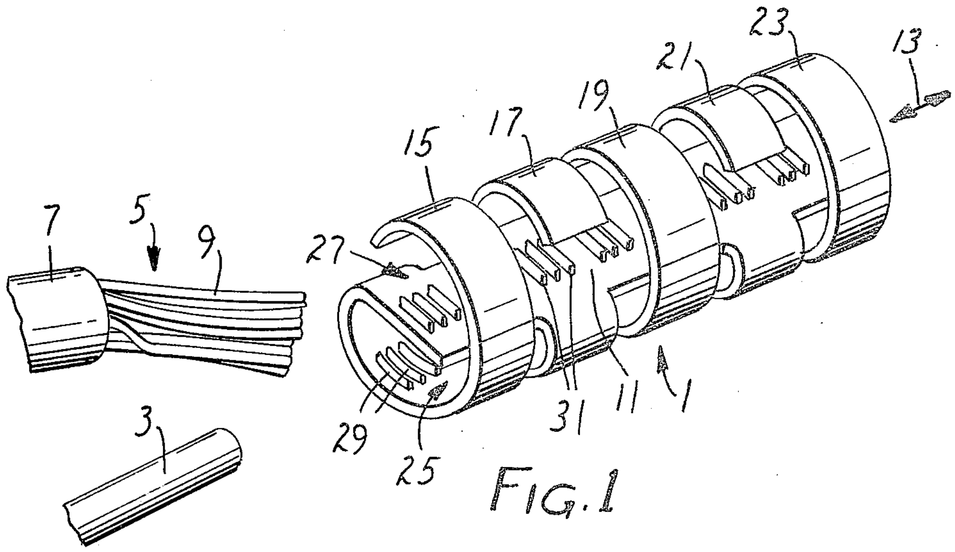
FIGS. 1 and 2 are perspective views of two crimp connectors according to the invention.

FIG. 1 shows a crimp connector 1 for interconnecting electrical wires 3 and 5. Wire 3 is a relatively thin magnet wire which is provided with a thin insulation, particularly a varnish insulation. Wire 5 is a stranded connecting wire having a larger cross-section, and the insulation 7 has been stripped from its end. The conductor of the connecting wire 5 consists of several strands 9.

The crimp connector illustrated is bent from a unitary sheet metal piece and includes a central flat bridge part 11 and a plurality of fingers 15, 17, 19, 21, 23, which depend from the bridge part 11 essentially radially with respect to the connector axis 13 and are circularly bent around the bridge part 11, thus forming two chambers 25 and 27, each being arranged on one side of the bridge part 11. One chamber 25 is destined to accommodate the magnet wire 3, and the other chamber 27 is destined to accommodate the stranded connecting wire 5. At least the magnet wire chamber has cutting means 29 on its interior surface, which for instance may be formed by stamped in ridges. The connector consists of an electrically conductive material, particularly a copper alloy, as it is used also for prior art crimp connectors. After the conductors to be interconnected have been introduced into the associated chambers, the chambers which are disposed side-by-side in the connector cross-section are compressed by means of a tool (not shown in the drawings), and thereby, a durable, mechanically and electrically reliable interconnection is obtained between the connector 1 and the conductors of wires 3 and 5. During the compression, the cutting means 29 cuts through the insulation of the magnet wire being within its chamber and thus provides electrical contact with the electrically conductive core of the magnet wire. In FIG. 1, the cutting means 29 are illustrated on the interior side of the fingers and further cutting means 31 are shown to be on the bridge part 11. In many cases, it will be sufficient if only the magnet wire chamber is provided with cutting means. In cases where pre-stripped magnet wires are used, cutting means are not necessary.

It can be recognized that with the embodiment shown in FIG. 1 the fingers 15, 17, 19, 21, 23 (a total of 5 fingers) extend from their roots about the bridge part 11, and define the chambers 25, 27 each on one side of the bridge part 11.

Thus, the fingers extend across the large part of the circumference of the crimp connector 1 and because of their length, can better adapt themselves to various cross-sections of conductors or conductor bundles. In FIG. 1, only a single magnet wire 3, and only a single stranded connecting conductor 5 are illustrated. In practice, however, frequently a plurality of magnet wires and/or a plurality of stranded connecting conductors are to be connected with the same connector. It is, therefore, advantageous that the fingers are relatively long so that they can better adapt themselves to the possibly complicated cross-sectional shapes which are obtained in the crimp connector upon the compression of the conductor bundles.

In the embodiment illustrated in FIG. 1, there is furthermore the characteristic feature that the fingers depend from two opposite edges of the bridge part 11 and the rows so formed are staggered. Thereby, a symmetrical bending and distribution of forces will be obtained upon the compression, whereby a smaller pressing force will suffice, and the compression will be more uniform over the whole circumference.

Furthermore, the embodiment according to FIG. 1 shows the feature that the one chamber 25 lying on the one side of the bridge part is bordered by root-adjacent portions for the fingers; that chamber is destined to accommodate the magnet wire 3. Thereby, the advantage is obtained that the relatively stiff root portions of the fingers can be pressed at a high specific load but yet softly on the magnet wire (which in practice is generally very thin). In contrast, the somewhat more yielding free end portions of the fingers serve to engage the connecting conductor 5 which generally is thicker and stranded, the free end portions of the fingers being capable of better conforming to the larger deformations of the stranded bundle.

In the embodiment illustrated in FIG. 1, each of the two chambers 25 and 27 is formed by a row of a plurality of fingers, namely, by five fingers each, with the row of five fingers extending over both chambers.

For the manufacture of the crimp connector according to FIG. 1, it is important that the fingers are bent from the bridge part 11 towards the same side thereof, namely, towards the lower side. This simplifies automatic manufacture by bending and results in the already described desirable feature that one of the chambers is formed solely by the root portions of the fingers.

Figure 2:
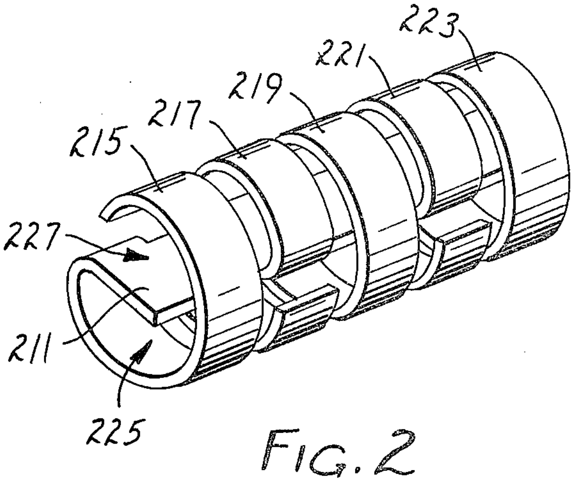
Figure 4:
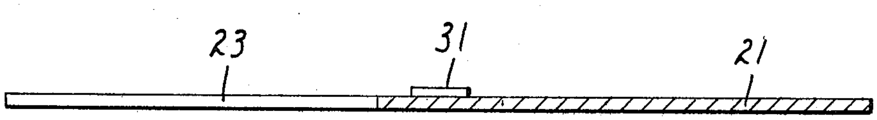
FIG. 4 is a cross-sectional view along the line 4—4 of FIG. 3.

FIG. 2 illustrates an embodiment of a crimp connector which is in large part similar to that according to FIG. 1. Therefore, parts corresponding to parts in FIG. 1 are designated with the same reference numerals, however, with numeral "2" preceding.

The crimp connector according to FIG. 2 distinguishes from that according to FIG. 1 particularly in that the fingers 215, 219, 223 which depend from the one longitudinal edge of the bridge part 211 are bent towards the one side (downwards) from the bridge part 211, whereas the fingers 217 and 221 depending from the opposite longitudinal edge of the bridge part 211 are bent towards the other side (upwards) from the bridge part 211. With this construction, substantially the same conditions will be obtained in both chambers 225 and 227, and in each chamber, areas of higher stiffness (root portions) alternate with areas of high resiliency (free end portions) in the longitudinal direction of the connector. This embodiment is particularly simple if plurality of magnet wires or connecting conductors are to be accommodated and clampingly secured.

Figure 3:
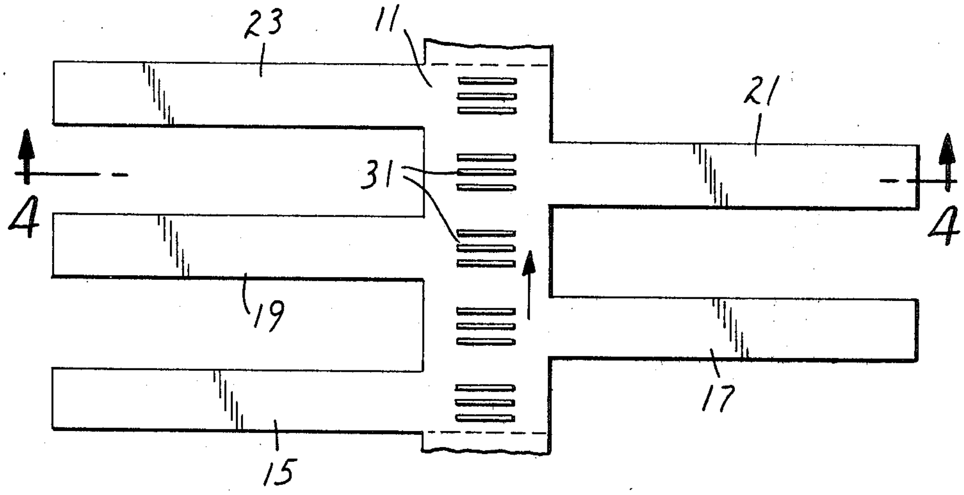
FIG. 3 is a plan view of a sheet metal piece which is suitable for the manufacture of crimp connectors of the kind illustrated in FIGS. 1 and 2.
Figure 5:
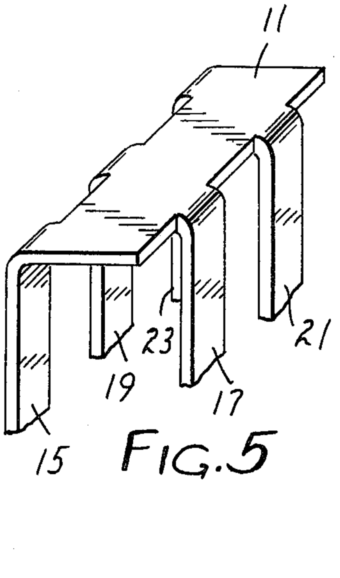
FIG. 5 is a perspective view of the sheet metal piece of FIG. 3 after a first bending step during the manufacture of the crimp connector of FIG. 1.
Figure 6:
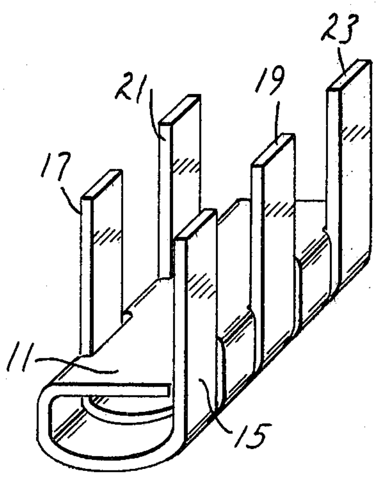
FIG. 6 is a perspective view of the sheet metal cut of FIG. 3 after a further bending step.

FIGS. 3 to 6 illustrate the manufacture of a crimp connector of the kind illustrated in FIG. 1. In FIG. 3, it is indicated by dotted lines that the sheet metal piece which is a simple flat sheet metal cut, can be a portion of an elongated strip extending in the direction of the arrow 13 (connector axis). As can be readily seen, the sheet metal pieces for manufacturing the crimp connectors thus can be conveniently cut from a long strip, the comb-like shaping being made already on the whole strip or, alternatively, only after having the individual pieces cut off, the shaping being done for instance by simple stamping, possibly combined with impressing the cutting means which are not illustrated in FIGS. 3 to 6. In many cases, it will be sufficient to provide cutting means on the bridge part only. There, only a relatively small deformation will take place upon the compression, whereby the effectiveness of the cutting means will less depend from the changes in shape which result upon compression in the connector and the lines included therein. Thus, it will be usually sufficient in case of the embodiment according to FIG. 1, to provide cutting means only on the side of the bridge part 11 which is disposed in the magnet wire chamber 25.

Figure 7:
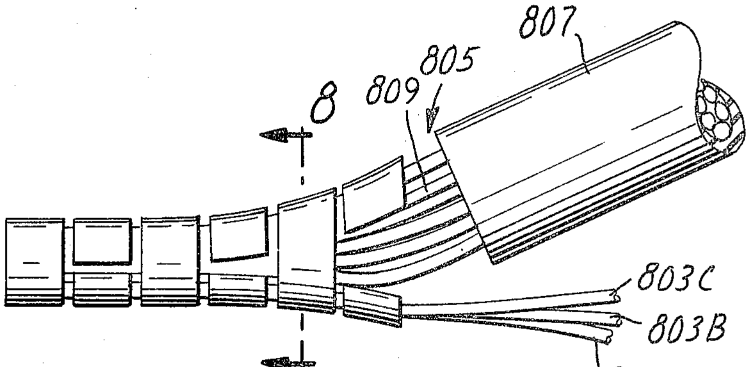
FIG. 7 is a side view of a third embodiment of a crimp connector according to the present invention, after it has been pressed onto the wires to be interconnected.
Figure 8:
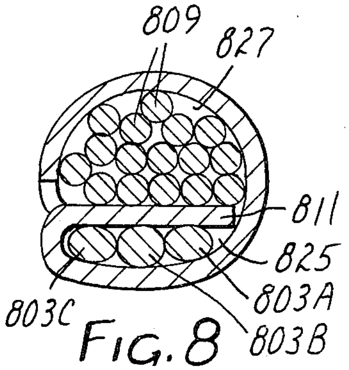
FIG. 8 is a radial sectional view along the line 8—8 of FIG. 7.

FIGS. 7 and 8 illustrate an embodiment which is also basically similar to that of FIG. 1. For corresponding parts, the same reference numerals as in FIG. 1 are used, however, with a preceding "8".

The embodiment according to FIGS. 7 and 8 has the characteristic that the cross-sections of the chambers 825, 827 increase towards the entrance area of the wires. In FIGS. 7 and 8, three magnet wires 803A, 803B, 803C are illustrated. The connecting wire 805 again has a core consisting of a plurality of strands 809. The channel-like enlargement of the crimp connector towards the entrance area results in a better protection of the conductors in case of mechanical movements, particularly oscillations, as occur frequently in machines.

Figure 9:
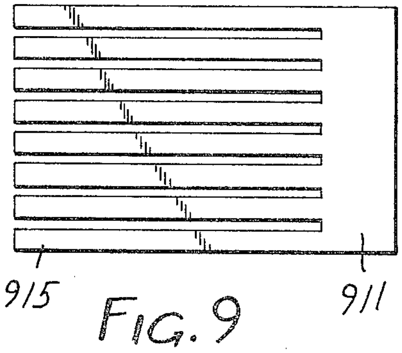
FIG. 9 is a plan view of a sheet metal piece for manufacturing fourth embodiment of a crimp connector according to the invention.

In FIG. 8 it is illustrated in the chamber 825 how the magnet wires may be deformed upon the compression of the connector. FIG. 9 illustrates a sheet metal piece for a crimp connector having a total of eight fingers, of which in FIG. 9 only the finger 915 is designated with a reference numeral. All fingers depend from one and the same edge of the bridge part 911. This may facilitate production; moreover, this construction also reduces sheet metal waste without necessitating complicated stamping patterns.

Figure 10:
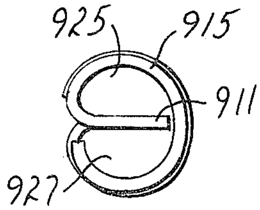
FIGS. 10 and 11 are axial views of crimp connectors manufactured from the sheet metal piece according to FIG. 9 by bending.

FIG. 10 illustrates a side view of a connector which will result from the sheet metal piece according to FIG. 9 if the individual fingers are bent alternatively towards the one and towards the other side of the bridge part 911. As in the case of FIG. 2, a crimp connector will result in which both chambers 925 and 927 are alternatively formed by root portions and free end portions of the fingers.

Figure 11:
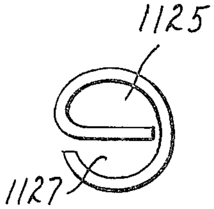

FIG. 11 illustrates the configuration which will result from the sheet metal piece according to FIG. 9 if all fingers are bent towards the same side of the bridge part. Then, similarly as with the embodiment according to FIG. 1, again a first chamber 1125 is obtained which is formed by root portions of the fingers only, and a second chamber 1127 which is formed by free end portions of the fingers. As compared with FIG. 1, less radial symmetry is obtained because of the greater simplicity of the sheet metal piece. However, the embodiment according to FIG. 11 will be satisfactory for many applications.

Figure 12:
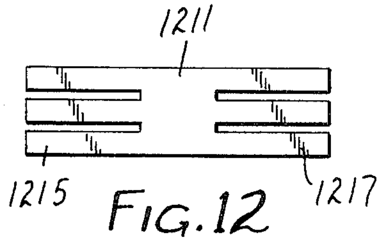
FIG. 12 is a plan view of a sheet metal piece for manufacturing a particularly simple crimp connector according to the invention.
Figure 13:
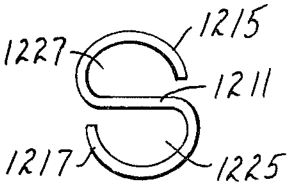
FIG. 13 is a side view, of a crimp connector according to the invention, which has been manufactured from the sheet metal piece according to FIG. 12 by bending.

FIGS. 12 and 13 illustrate the possibility of using shorter and thus more rigid fingers which each extend across one chamber only.

FIG. 12 illustrates a sheet metal piece, again in the form of a flat sheet metal cut, which produces little waste, similarly as with the cut according to FIG. 9. However, fingers 1215 and 1217 are provided on both longitudinal edges, respectively, of the bridge part 1211, and this without being mutually staggered. The length of the fingers is dimensioned so that each finger can form a single chamber only.

FIG. 13 illustrates a lateral view of the crimp connector resulting from the sheet metal piece according to FIG. 12 by bending. The chambers 1225 and 1227 formed on both sides of the bridge part 1211 are alike; furthermore, there is a high degree of radial symmetry.

I claim:

1. A crimp connector for electrical wires for interconnecting at least one magnet wire and at least one connecting wire, comprising a unitary piece of sheet metal having a bridge part and a row of a plurality of fingers which depend from the bridge part radially of the axis of the connector, said fingers being bent circularly around the bridge part to form two chambers disposed side by side, one of said chambers being formed to accommodate a said magnet wire and the other chamber being formed to accommodate a said connecting wire, at least the magnet wire chamber having cutting means provided on its interior surface for cutting through insulation on a said magnet wire upon compression of the chamber to make electrical connection with the electrically conductive core of the magnet wire.

2. The connector according to claim 1 wherein the fingers extend from their root portions around the bridge part and define both chambers, one on each of the two sides of the bridge part.

3. The connector according to claim 2 wherein the fingers depend from two opposite edges of the bridge part and are arranged in a mutually staggered pattern.

4. The connector according to claim 3 wherein the magnet wire chamber is bordered by the root portions of the fingers.

5. The connector in accordance with claim 2 or 3 wherein the fingers are bent off from the bridge part towards the same side thereof.

6. The connector in accordance with claim 2 or wherein the fingers are alternatively bent from the bridge part towards opposite sides thereof.

7. The connector in accordance with claim 1 wherein each said chamber is provided with at least three said fingers.

8. The connector according to claim 7 wherein each said chamber is provided with five to eight said fingers.

9. The connector in accordance with claim 1 wherein the cross-sections of the chambers increase towards the entrance area of the lines.

10. The connector in accordance with claim 1 wherein the cutting means are provided at least on the bridge part.

* * * * *